United States Patent
Gresch et al.

(10) Patent No.: US 10,694,670 B2
(45) Date of Patent: Jun. 30, 2020

(54) METHOD AND ARRANGEMENT FOR CONTROL OF THE SPEED OF A BALER

(71) Applicant: DEERE & COMPANY, Moline, IL (US)

(72) Inventors: Valentin Gresch, Ensheim (DE); Benedikt Jung, Kaiserslautern (DE)

(73) Assignee: DEERE & COMPANY, Moline, IL (US)

( * ) Notice: Subject to any disclaimer, the term of this patent is extended or adjusted under 35 U.S.C. 154(b) by 22 days.

(21) Appl. No.: 15/955,137

(22) Filed: Apr. 17, 2018

(65) Prior Publication Data
US 2018/0317388 A1 Nov. 8, 2018

(30) Foreign Application Priority Data
May 2, 2017 (DE) .................. 10 2017 207 347

(51) Int. Cl.
| | |
|---|---|
| *A01D 41/127* | (2006.01) |
| *A01B 69/04* | (2006.01) |
| *A01B 79/00* | (2006.01) |
| *G05D 1/02* | (2020.01) |
| *A01F 15/08* | (2006.01) |

(Continued)

(52) U.S. Cl.
CPC ........ *A01D 41/1274* (2013.01); *A01B 69/001* (2013.01); *A01B 69/008* (2013.01); *A01B 79/005* (2013.01); *A01F 15/08* (2013.01); *A01F 15/0825* (2013.01); *G05D 1/0223* (2013.01); *A01D 41/127* (2013.01); *A01F 15/04* (2013.01); *B60Y 2200/222* (2013.01); *B60Y 2300/18* (2013.01); *G05D 2201/0201* (2013.01)

(58) Field of Classification Search
CPC   A01D 41/127; A01D 41/1274; A01B 69/001; A01B 79/005; A01B 69/008; A01F 15/04; A01F 15/08; A01F 15/0825; G05D 1/0223; G05D 2201/0201; B60Y 2200/222; B60Y 2300/18
USPC ........................................................ 701/50
See application file for complete search history.

(56) References Cited

U.S. PATENT DOCUMENTS

| | | |
|---|---|---|
| 6,389,785 B1 | 5/2002 | Diekhans et al. |
| 6,431,981 B1 * | 8/2002 | Shinners .............. A01D 43/085 |
| | | 460/6 |

(Continued)

FOREIGN PATENT DOCUMENTS

| | | |
|---|---|---|
| CN | 104709279 A | 6/2015 |
| DE | 102005004508 A1 | 8/2006 |

(Continued)

OTHER PUBLICATIONS

European Search Report issued in counterpart application No. 18169497.7 dated Oct. 1, 2018. (8 pages).

(Continued)

*Primary Examiner* — Atul Trivedi

(57) ABSTRACT

A method and an arrangement for control of the speed of a baler includes detection and mapping of one or more of a crop property and data derived therefrom during the harvesting of a field by a combine harvester. Crop residues are deposited in a windrow in the field. The method and arrangement control the speed of the baler in the pickup of the windrow while taking into account one or more of the mapped crop property and the data derived from the crop property.

17 Claims, 3 Drawing Sheets

(51) Int. Cl.
   *A01B 69/00*   (2006.01)
   *A01F 15/04*   (2006.01)

(56) References Cited

U.S. PATENT DOCUMENTS

| | | | |
|---|---|---|---|
| 6,546,705 | B2 | 4/2003 | Scarlett et al. |
| 7,400,957 | B2 | 7/2008 | Hofer et al. |
| 9,930,834 | B2* | 4/2018 | Chaney .................. A01F 15/08 |
| 10,255,670 | B1* | 4/2019 | Wu ....................... H04N 5/2252 |
| 2007/0175198 | A1 | 8/2007 | Viaud et al. |
| 2011/0092726 | A1* | 4/2011 | Clarke .................. C12M 21/02 |
| | | | 554/175 |
| 2012/0096827 | A1* | 4/2012 | Chaney .............. A01F 15/0833 |
| | | | 56/341 |
| 2015/0134175 | A1* | 5/2015 | Derscheid ........... A01F 15/0825 |
| | | | 701/23 |
| 2015/0302305 | A1* | 10/2015 | Rupp .................. A01B 79/005 |
| | | | 706/46 |
| 2015/0379785 | A1* | 12/2015 | Brown, Jr. .......... A01B 79/005 |
| | | | 701/29.1 |
| 2016/0066505 | A1* | 3/2016 | Bakke ..................... H04W 4/70 |
| | | | 700/275 |
| 2016/0088798 | A1* | 3/2016 | Lang ...................... B30B 9/301 |
| | | | 56/341 |
| 2016/0309655 | A1* | 10/2016 | Treffer .................. A01D 43/04 |
| 2017/0013772 | A1* | 1/2017 | Kirk ...................... A01F 15/071 |
| 2017/0112061 | A1* | 4/2017 | Meyer ................ A01D 41/1272 |
| 2017/0318749 | A1* | 11/2017 | Kraus .................. A01F 15/085 |
| 2017/0339822 | A1* | 11/2017 | Gresch .................... B62D 6/002 |
| 2018/0260674 | A1* | 9/2018 | Hamilton ........... G06K 7/10425 |
| 2018/0317388 | A1* | 11/2018 | Gresch ............... A01D 41/1274 |
| 2018/0325013 | A1* | 11/2018 | Boydens ................. A01F 15/08 |
| 2018/0325014 | A1* | 11/2018 | Debbaut .............. G05D 1/0274 |
| 2019/0066234 | A1* | 2/2019 | Bedoya .............. G06K 9/00657 |
| 2019/0090472 | A1* | 3/2019 | Crinklaw ............. A01B 69/008 |
| 2019/0133044 | A1* | 5/2019 | Thompson ............ B30B 9/3007 |
| 2019/0191615 | A1* | 6/2019 | Thompson ............ A01F 15/085 |

FOREIGN PATENT DOCUMENTS

| | | |
|---|---|---|
| DE | 102005029405 A1 | 1/2007 |
| DE | 102005047306 A1 | 4/2007 |
| DE | 102008043716 A1 | 5/2010 |
| DE | 102014204603 B3 | 7/2015 |
| EP | 1266558 A2 | 12/2002 |
| EP | 1685759 A1 | 8/2006 |
| EP | 1769662 A1 | 4/2007 |
| EP | 2267567 A2 | 12/2010 |
| EP | 2952081 A1 | 12/2015 |
| EP | 3001894 A1 | 4/2016 |

OTHER PUBLICATIONS

Lutz Hoffman, Windrow Scanning with Ultrasound, pp. 266-268, volume: May 1993, Landtechnik.

* cited by examiner

METHOD AND ARRANGEMENT FOR CONTROL OF THE SPEED OF A BALER

RELATED APPLICATIONS

This application claims priority to German Patent Application 102017207347.0, filed May 2, 2017, the disclosure of which is incorporated herein by reference in its entirety.

BACKGROUND OF THE DISCLOSURE

Square balers are used to harvest agricultural crops like hay, silage, or straw. The square baler is pulled by a tractor and mechanically driven by a PTO shaft. The crop is usually precompacted in a precompression chamber and then pressed against the already existing bale by a reciprocally acting plunger in the slightly convergent main bale chamber.

To operate the baler with maximum productivity, a speed of travel may be adjusted in dependence on the size and density of the windrow. In the prior art, various manufacturers have offered control systems that regulate the forward speed of the tractor on the basis of a sensor signal from the square baler. The sensor signal is generated by a sensor integrated into the pickup, precompression chamber, or main bale chamber, and represents a characteristic value for the load of the baler. Many such sensors are known in the prior art (e.g., U.S. Pat. No. 6,546,705 B2). For example, the torque or rotary speed at the pickup, forces on the packers or plunger, or even the number of plunger strokes per new flake are sensed. The disadvantage of these control systems is that they can only operate reactively and, therefore, cannot react to larger variations in the windrow or can react only with a delay. This can result in problems, in particular, when baling straw, which is chopped beforehand by a combine harvester and laid in the windrow. If the combine harvester needs to stop for any reason, a large amount of straw will collect at a single point due to the delayed straw deposition. The driver must actively intervene in such situations, stop the system, and manually drive over the heap of straw. Otherwise, he risks plugging the baler.

To solve this problem, it was proposed to detect and characterize the windrow in front of the tractor by means of sensor technology. This can take place, for example, by means of a (stereo) camera (e.g., U.S. Pat. No. 7,400,957 B2), laser scanner (e.g., U.S. Pat. No. 6,389,785 B1), or ultrasound sensors (e.g., L. Hofmann, "Windrow Scanning with Ultrasound," Landtechnik 5, 1993, pp. 266-268).

The cost-intensive sensor expense and susceptibilities to environmental effects like dust and dirt have prevented broad commercial use of such predictive systems up to now. It is also disadvantageous with conventional sensor detection of the windrow that only geometric data about the windrow, such as the width, height, cross-sectional area, or volume, can be determined. However, the windrow density and possibly moisture level are likewise relevant for optimum baler throughput control.

The problem of speed optimization also exists with round balers (e.g., German Patent Application No. 102005029405 A1).

European Patent Application No. 2952081 A1 describes a procedure in which various data about the straw are stored during the harvesting of grain (for example, the position of the windrow and the direction of travel of the combine harvester as it was being produced), and the data is used to plan the path of the baler for picking up the windrow, so that the baler can travel in the opposite direction from the direction of the combine harvester. It was further proposed to steer a baler by means of a stored windrow position (e.g., U.S. Patent Application Publication No. 2007/175198 A1, German Patent Application No. 102005047306 A1, German Patent Application No. 102005004508 A1, European Patent Application No. 2267567 A2). The above problem of speed control, however, is not solved by these measures.

Therefore, there exists a need in the art for developing an inexpensive and robust throughput control system for balers that can handle large variations in the windrow.

SUMMARY OF THE DISCLOSURE

A method for control of a speed of a baler is provided. The method includes detecting and mapping a crop property and/or data derived therefrom during a harvesting of a field by a combine harvester in which crop residues are deposited in a windrow, and controlling the speed of the baler during a pickup of the windrow while taking into account the mapped crop property and/or the data derived therefrom.

An arrangement for control of a speed of a baler is provided. The arrangement includes a control of a towing vehicle pulling the baler and/or a control unit of the baler. The control unit of the baler is configured to control the speed of the baler in a pickup of a windrow while taking into account 1.) a crop property mapped during harvesting of a field by a combine harvester, crop residues being deposited by the combine harvester in the windrow, and/or 2.) data derived from the crop property.

BRIEF DESCRIPTION OF THE DRAWINGS

The drawings present an embodiment example of the disclosure, which is described in more detail below, where the reference numbers are not to be used in a restrictive interpretation.

DETAILED DESCRIPTION OF THE DRAWINGS

Figure 1:
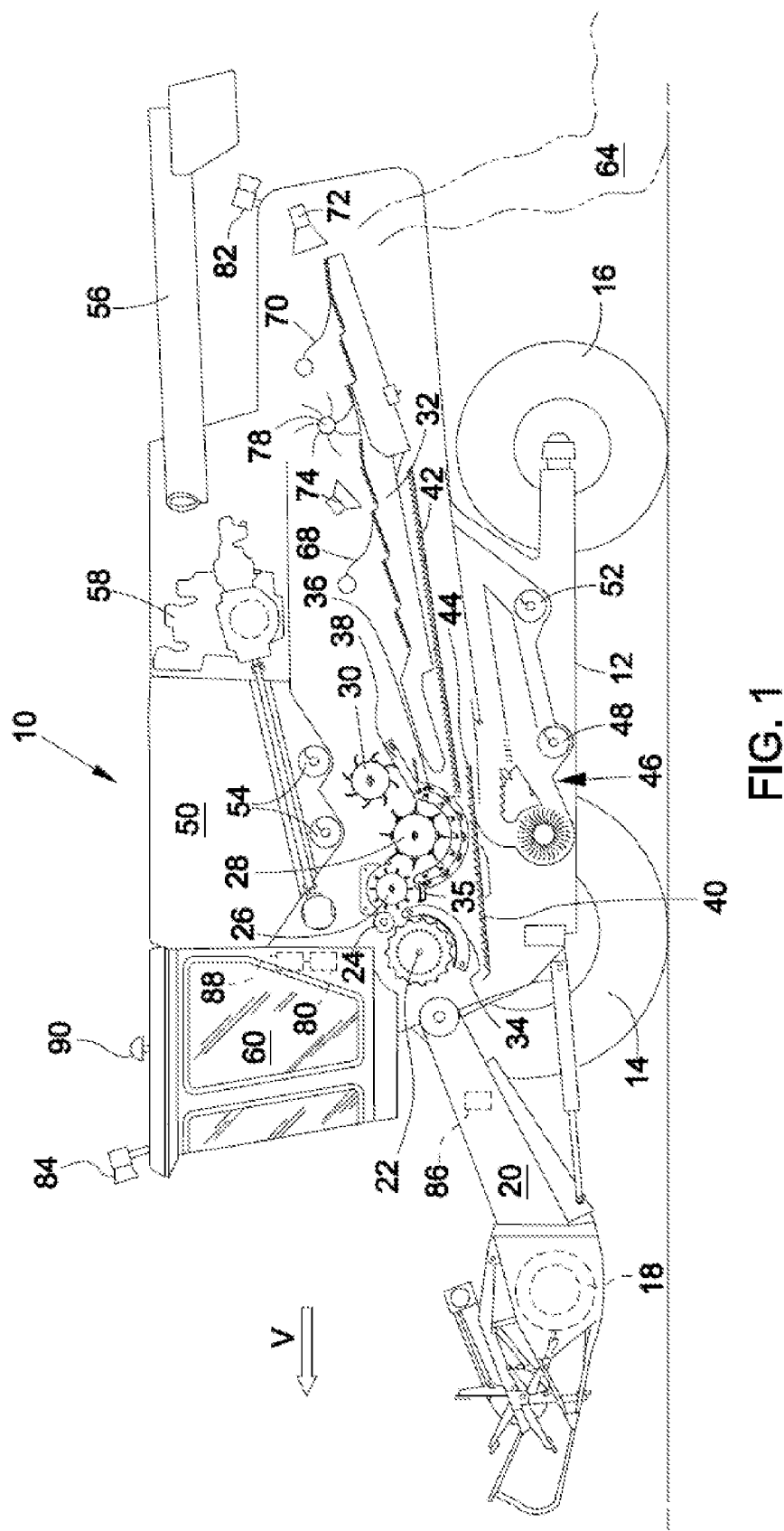
FIG. 1 shows a schematic side view of a combine harvester in accordance with an embodiment of the present disclosure.

An automated mapping of the windrows when they are created and processing of said data for predictive throughput control for balers is proposed. In the illustrated embodiment, the procedure is described in the case of use in grain straw, i.e., in harvesting with a combine harvester and subsequent baling with a square baler. However, the procedure can also be used on other types of balers, such as round balers. It can also be used in the harvesting of maize.

Data that can be further processed to characterize the crop (e.g., straw) residues laid in the windrow are generated in a first step. This takes place by means of sensing and georeferenced data acquisition on the combine harvester. The processed crop is sensed, the position of the combine harvester and its orientation are detected by GNSS receivers, and the position or trajectory of the windrow deposition is computed in a land-based coordinate system and recorded in a storage device together with the sensed data (and/or data derived from the sensed data, which can involve any properties of the crop or values of the baler speed that is to be controlled). In the case of detection of the crop stand in front of the cutter head, the position or trajectory of the cutter bar and data about the cutter width as well as the machine dimensions of the combine harvester can be taken into account in order to determine the position of the windrow and the amount of straw in it.

Between the cutting operation or pickup of the straw on the cutter plate (or the sensing of the crop, which serves to map the amounts of straw) and the deposition of the windrow on the field, a certain delay time elapses, which can be taken into account in the recording of the windrow position. The delay time is additionally dependent on certain machine settings of the combine harvester. The delay time can be determined with sufficient accuracy via a detection and evaluation of the relevant machine parameters of the combine harvester. The following parameters can be taken into account depending on the type of combine harvester that is used: conveyor speed (augers or conveyor belts) at the cutters, speed of rotation of the inclined grain conveyor, rotor speed of the threshing and separator rotor (in case of an axial combine harvester), drum speed of the threshing element (in the case of straw walker or hybrid combine harvesters), rotor speed of the separator element (in the case of hybrid combine harvesters), speed of rotation of the walker drive (in the case of straw walker combine harvesters).

Sensor values and/or operating parameters of the combine harvester are likewise employed to determine the amount of straw in the windrow.

Also, any imaging sensors (for example, stereo cameras) that are installed on the combine harvester or other sensors monitoring the working area or windrow deposition area can be used to detect the volume and other geometric parameters of the stand or the deposited windrow.

Moreover, data on grain yield, grain moisture, and straw moisture can likewise be stored and processed. For example, a volume flow that is drawn into the machine can be calculated by means of the known cutter width together with the height of the cutters and reel and the speed of travel and a sensor-detected stand density and height (for example, see German Patent Application No. 102008043716 A1). A straw weight can be further estimated with the help of the current yield from the yield sensor and the knowledge of the grain/straw ratio from the crop type.

A relative moisture distribution of the windrow can be reached by direct moisture measurement of the straw or indirect estimation of the straw moisture by measuring the grain moisture. Generally, the windrow will dry a little before the baling operation so that the absolute moisture values determined on the combine harvester are no longer current. However, a moisture sensor, which provides reference values with which the moisture in the windrow can be calibrated, is also advantageously built in on the baler, as described in further detail below.

In particular, clumps of wet straw can thus be mapped and the throughput control of the square baler predictively adjusted for them. Such "wet clumps" today are an important problem for the driver of the square baler, since they are often recognized too late and then plug up the intake or the precompression chamber of the baler. This leads to work stoppage and thus to loss of productivity.

The straw quality is likewise relevant for the straw harvest with the baler. The term straw quality is understood to mean, in particular, the average straw length or the length distribution of the individual straws, in addition to aspects of the straw moisture level. The straw quality can advantageously be determined by means of an imaging camera system or estimated on the basis of moisture level and type of combine harvester. As desired, it is also possible to estimate the straw quality by using operating parameters of the combine harvester, such as the existing concave clearance compared to the recommended value for the crop type, as well as the percentage of broken grain, which is determined by a grain quality camera. One starts from the assumption that a high broken grain fraction and/or low concave clearance leads to poorer straw quality for reasons of higher mechanical stress on the straw during the threshing operation.

The throughput control of the baler can be refined on the basis of a sensor-determined straw quality or straw quality computed on the basis of a model. Also, the data can be displayed to the driver of the (square) baler so as to facilitate a decision whether knives should be used or to activate or deactivate the knives automatically.

A kind of application map for the baler is created from the data indicated above. Using it, the throughput control of the baler is predictively controlled in advance. The tractor speed is modulated by means of a substantially known speed control, so that a maximum throughput is achieved.

The creation of said application map can take place on a control device of the combine harvester, a remote computer system, a tablet computer, or even on a control device of the tractor or the baler.

Besides the windrow position, the following parameters that are relevant for the predictive throughput control, among other things, can be calculated in a georeferenced manner and transmitted to the baler: type of crop (for example, wheat straw, barley straw, etc.), relative windrow mass, windrow length, moisture level of the windrow, geometric windrow data (width, height, cross section, etc.), indication of "wet clumps," indication of a windrow clump (for example, because the combine harvester had to stop).

Any or all of the data is transmitted to the baler or to a vehicle pulling it, evaluated, and used for throughput regulation. Here the position of the baler is determined and compared to the application map. The determined relative characteristics (relative windrow mass, moisture level of the windrow at cutting) are compared with current, sensor-detected parameters and calibrated.

If a precompression chamber of a square baler has sensors to determine the mass throughput, the force on the packers and precompression chamber floor can be measured and from that the mass throughput can be calculated (e.g., European Patent Application No. 3001894 A1).

A speed of travel is calculated by means of the current mass throughput data and predicted amounts of straw and sent as a command to the tractor in accordance with one or more methods understood by those having ordinary skill in the art (for example, via ISOBUS class 3, Tractor Implement Automation). In particular, in the case of "wet clumps" or large straw heaps, the control system will now slow down the tractor very much more than with previously known systems, so that the crop amount can be more cleanly picked up and baled without additional operator intervention.

The control system in accordance with one or more embodiments of the present disclosure, as in the prior art, can be run in various operating modes, which are designed to optimize the throughput, the bale quality, or a mixed control.

Combine Harvester

FIG. 1 shows a self-propelled combine harvester 10 with a frame 12 which is supported on the ground by driven front wheels 14 and steerable rear wheels 16 and is moved forward by said wheels. The wheels 14 are put into rotation by a drive means, which is not shown, so as to move the combine harvester 10, for example, over a field that is to be harvested. In what follows, directional data such as forward and backward refer to the direction of travel V of the combine harvester 10 in a harvesting operation.

A grain header 18 in the form of a cutter bar is removably attached to the front end of the combine harvester 10 so as to harvest grains or other types of threshable crops from the field during a harvesting operation and to transport it up and to the rear through an inclined grain conveyor 20 to a multidrum threshing system, which includes, from front to back in direction of travel V, a threshing drum 22, a separator drum 24, an overshot beater drum 26, a tangential separator 28, and a turning drum 30. Downstream from the turning drum 30 is a straw walker 32, which is composed of a plurality (for example, 5 or 6) of individual walkers, which are set, phase-shifted, into an oscillating motion via a crankshaft 102 (see FIG. 2), so as to separate grain from straw and discharge the straw onto the field as windrow 64 at the rear of the combine harvester 10, if it is not chopped by a straw chopper (not shown) and distributed on the field over the width of the cutter head 18. The threshing drum 22 is surrounded in its lower and rear region by a concave 34. Under the conveyor drum 26, there is a pan 35, which is closed or perforated, while, above the conveyor drum 26, there is a fixed cover plate, and, under the tangential separator 28, there is a separator basket 36 with adjustable finger elements. A finger rake 38 is arranged under the turning drum 30.

Under the multidrum threshing unit, there is a front conveyor pan 40, which carries out an alternating back and forth oscillating motion in operation. A rear conveyor pan 42 is arranged under the straw walker 32 and performs an alternating back and forth oscillating motion in operation. The front conveyor pan 40 transports the mixture of grain, short straw, and chaff flowing downward through the concave 34 and through the tangential separator 36 to the rear, while the rear conveyor pan 42 transports the mixture of grain, short straw, and chaff flowing through the straw walker 32 to the front. The rear conveyor pan 42 passes its mixture at its front end onto the front conveyor pan 40, which discharges it downward through a rear finger rake 44. The mixture discharged by the front conveyor pan 40 then goes to a cleaning device 46. The rear conveyor pan 42 could also discharge its mixture directly to the cleaning device 46.

Grain cleaned by the cleaning device 46 is transported by a grain auger 48 to an elevator (not shown), which transports it to a grain tank 50. A reverse auger 52 returns under-threshed heads to the threshing process through another elevator (not shown). The chaff can be ejected at the rear of the sieve device by a spinning chaff spreader, or it can be handled by a straw chopper (not shown) arranged downstream from the straw walker 32. The cleaned grain can be unloaded from the grain tank 50 by an unloading system with cross augers 54 and an unloading conveyor 56.

The said systems are driven by means of an internal combustion engine 58 and controlled and steered by an operator from a driver cab 60. The different devices for threshing, transport, cleaning, and separating are situated within the frame 12. Outside of the frame 12 there is an outer shell, which most often is hinged.

It should be noted that the multidrum threshing unit shown here with the connected straw walker 32 is only one possible embodiment. It could also be replaced by a single transversely arranged threshing drum and a connected separating device with a straw walker or a single or multiple transversely arranged threshing drum(s) and a connected separating device with one or more separating rotors, or by one or more axial threshing and separating rotors, to name non-limiting examples.

The combine harvester 10 is equipped with a control device 80, which is connected to a memory device 88 and a position determining device 90. The position determining device 90 receives signals from a satellite-based position determining system (GPS, Galileo, GLONASS, etc.) and possibly correction signals, and computes the current position of the combine harvester 10. A map in which the positions at which the combine harvester 10 deposits the windrow 64 at its rear, the windrow having ejected crop residues (straw), is stored in the memory device 88 during the harvesting operation by means of sensors, which are described below, and the relevant amounts of straw are entered.

A first sensor 68 is a mechanical feeler to detect the thickness of the straw mat on top of the straw walker 32. It is disposed approximately in the middle of the straw walker 32, suspended rotatably about an axis that runs horizontally and transversely to the direction of travel above the straw walker 32, and pretensioned downward by spring force and gravity. A potentiometer or an optical code wheel serves to detect the angular position of the first sensor 68. Crop present above the straw walker 32 rotates sensor 68 upward about the axis. A set of data about the angle of rotation is sent to the control device 80.

A second sensor 70, which is structurally identical to the first sensor 68, is disposed downstream from the first sensor 68 above the end region of the straw walker 32. The angle of rotation of sensor 70 is likewise detected and a corresponding data set is sent to the control device 80.

A third sensor 72 in the form of a camera is disposed toward the rear of the end region of the straw walker 32. The sensor 72 captures an image of the crop on the straw walker 32 and the crop falling down at the end of the straw walker 32. The third sensor 72 is connected to an image processing system, which is realized within the control device 80 or can be inserted between the sensor 72 and the control device 80. The image processing system is designed to extract at least one of the following items of data from the video signal of the camera and send it to the control device 80: thickness of the straw mat on the straw walker 32 and the speed at which the straw mat moves to the rear on the straw walker 32 (this speed can be evaluated by identifying points in the straw mat, for example prominent straws, and detecting their movement).

A fourth sensor 74 is arranged approximately in the middle of the straw walker 32 and looks down at the straw mat from above. The fourth sensor 74 is a radar sensor with a transmitter for relatively short-wave electromagnetic waves and a receiver to detect reflected waves. The fourth sensor 74 derives at least one of the following parameters from the elapsed time, intensity, and frequency shift (Doppler effect) of the waves from the transmitter reflected by the straw mat and sends it to the control device 80: thickness of the straw mat and its speed toward the rear on the straw walker 32. In order to be able to determine the thickness and speed of the straw mat on the straw walker 32 as accurately as possible, a data set about the relevant position and/or direction of movement of the straw walker 32, which is determined by means of an angle sensor 80 at the shaft of the straw walker 32, is sent to the fourth sensor 74 in an embodiment. The fourth sensor 74 can determine the position and speed of the straw walker 32 by means of the values of the angle sensor 80 and subtract them from the values measured by the transmitter and receiver.

A fifth sensor 78 is composed of a shaft with tines projecting radially outward from it, which is disposed horizontally and transverse to the forward direction V, and a rotary speed sensor and is arranged above the straw walker 32. The tines are preferably curved in a trailing direction and engage the straw mat. The average speed of rotation of the sensor 78 accordingly is correlated with the conveyor speed of the crop on the straw walker 32.

A sixth sensor 86 detects the crop throughput through the inclined grain conveyor 20. In this regard, one is referred to the disclosure of EP 1 266 558 A2. A seventh sensor 84 is designed as a stereoscopic or monoscopic camera with image processing system or sampling radar and/or laser sensor and registers the standing crop in front of the cutter head 86. An eighth sensor 82 is designed as a stereoscopic or monoscopic camera with image processing system or sampling radar and/or laser sensor and registers the windrow 64 at the rear of the combine harvester 10.

In possible embodiments, it is possible for only one or a plurality of the indicated sensors 68, 70, 72, 74, 78, 86, 84, 82 to be present.

It would also be conceivable (additionally or as an alternative to the sensors) to determine the amounts of straw by means of machine parameters of the combine harvester. Relevant operating parameters are, in particular, the engine power used for the conveyor elements, for example threshing and separating elements, and/or inclined grain conveyor, or the total engine power used without itemization into the individual components, the torque or rotary pressure of the threshing and separating rotors (in the case of an axial combine harvester), the torque of the threshing element 22 (in the case of a straw walker or hybrid combine harvester), the torque of the separating element 28 (in the case of a multidrum or hybrid combine harvester), the torque of the drive of the straw walker 32 (in a straw walker combine harvester), the signal from a grain yield or grain moisture sensor, the driving speed, the height of the cutter and reel, and the type of crop for determining the grain-straw ratio. From the grain yield detected by sensor or in dependence on drive power, one can accordingly draw a conclusion about the amount of straw, in particular by using one or more of the said data items.

The control 80 detects data about the position of the windrow 64 and the associated amounts of straw during the harvesting operation by means of the signals of the position determining device 90 and one or more of the sensors 68, 70, 72, 74, 78, 86, 84, and/or 82. Since the sensors 68, 70, 72, 74, 78, 86, 84, and/or 82 interact with the crop at points that are offset with respect to the ultimate position of deposition of the windrow 64 and are also offset with respect to the position determining device 90, in each case here, a recalculation takes place of the position determined by means of the position determining device 90 to the positions of the sensors 68, 70, 72, 74, 78, 86, 84, and/or 82, along with a recalculation of the position of the sensors 68, 70, 72, 74, 78, 86, 84, and/or 82 to the position at which the crop or straw interacting with the sensor 68, 70, 72, 74, 78, 86, 84, and/or 82 is in fact deposited in windrow 64. Here, one can employ the known transport speeds of the crop in combine harvester 10, which can be determined, for example, by means of one or more of the sensors 78 and 72 for the transport speed of the straw walker 32. The rotary speeds of the drives of the cross auger of the cutter head 18, the inclined grain conveyor 20, and the threshing unit 22, 26, 28, which are known to the control device 80 through appropriate signals or target values, can be taken into account analogously. The measurements of the said transport devices are likewise known to the control device 80 and have been deposited in memory 88.

Accordingly, after the end of a harvesting operation, a map of the field, in which the positions of the windrow 64 and the amounts of straw are deposited site-specifically and georeferenced, is entered into the memory device 88.

Tractor and Baler

Figure 2:
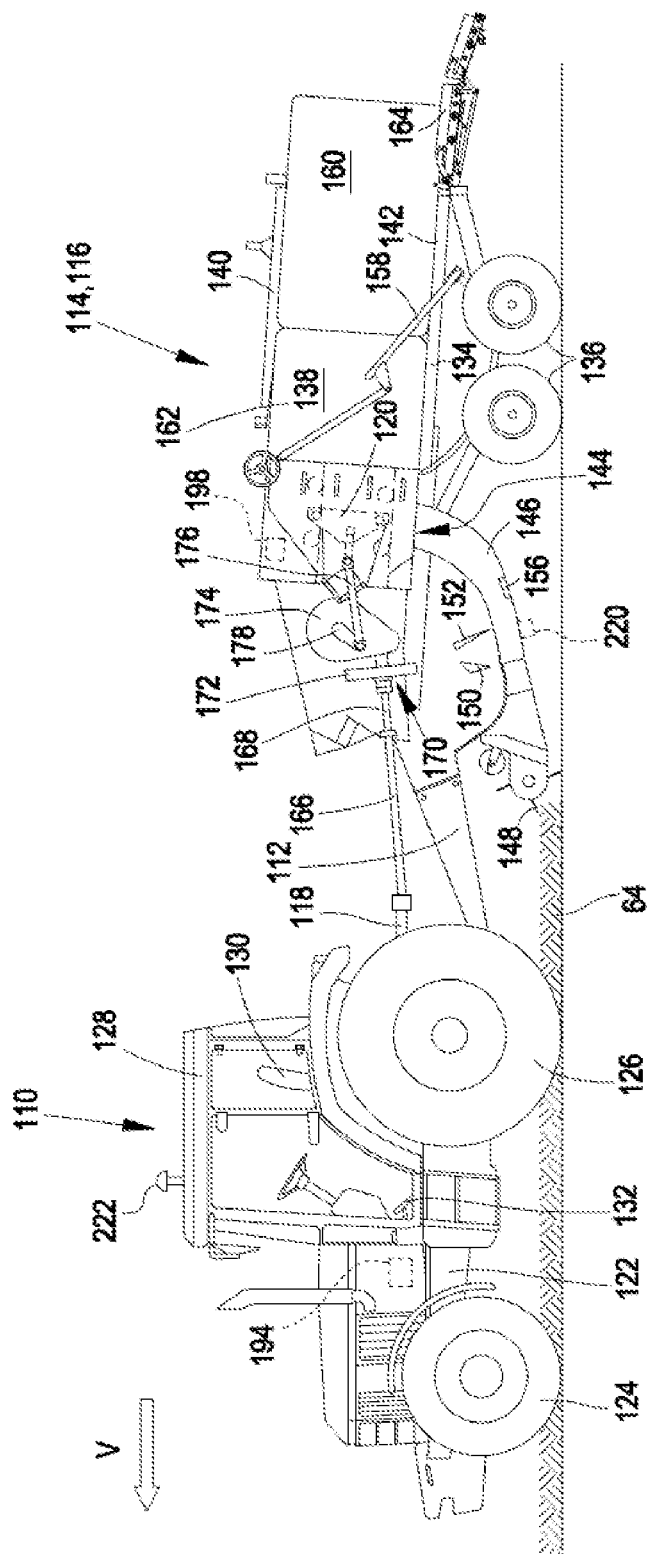
FIG. 2 shows a side view of a tractor with an attached square baler in accordance with an embodiment of the present disclosure.

FIG. 2 shows an agricultural utility vehicle in the form of a tractor 110, which, via a drawbar 112, pulls a baler 114 in the form of a square baler 116. A power take-off (PTO) shaft 118 serves to power movable elements of the baler 114 and in particular a plunger 120. The tractor 110 is built on a chassis 122, which is supported on steerable front wheels 124 and powered rear wheels 126 and carries a cab 128, in which there is an operator position 130. The propulsive speed of the tractor 110 can be set by an operator by means of an input device 132 in the form of a pedal or a lever, to which a target speed can be set without continuing operator interaction.

The square baler 116 serves to produce rectangular cuboid bales. The square baler 116 has a frame 134, which is supported on ground support wheels 136 in a tandem arrangement. Connected to the frame 134 is the drawbar 112, which extends forward from the frame and is made so that it can be connected to the tractor 110, which is equipped with the PTO shaft 118, so as to provide power to drive various driven components of the square baler 116. A bale chamber 138 in the form of a chamber of rectangular cross section is formed, in part, by a housing upper part 140 and a housing base 142, where the housing base 142 is provided with a material inlet 144, to which a curved feed channel 146 is connected. The side walls of the bale chamber 138 and/or the housing upper part 140 can be rigidly mounted or can be adjustable by actuators (not shown), so that the cross section of the bale chamber 138 can be changed. The lateral pressure on the bale 162 and thus the bale density can be varied by adjusting the actuators.

A feed device has a crop pickup device 148 in the form of a pickup with associated holddown, a packer fork 150, and a stuffer fork 152. The crop pickup device 148 includes a centering auger and is arranged in front of the feed channel 146, so as to lift the windrow 64 of crop (produced by combine harvester 10 of FIG. 1) from the ground and deliver it to the packer fork 150, which serves to compact the crop in the feed channel 146 until a flake of preselected density has collected in the feed channel 146 and is stuffed by the stuffer fork 152 into the bale chamber 138 through the material inlet 144. At a front lower point in the feed channel 146, a spring-loaded flap 156 is pivotably mounted; depending on the density of the crop in the feed channel 146, it pivots and indicates when a desired material density has been reached in the feed channel 146 so as to actuate an electrical control circuit via a control unit 198 of the baler 114 (see FIG. 3), which produces a corresponding drive connection, which activates the stuffer fork 152, so that the flake is moved into the bale chamber 138. In what follows, directional data such as forward and backward always refer to the forward direction V of the tractor 110 and the square baler 116, which in FIG. 2 runs from right to left.

When the flake has been introduced into the bale chamber 138, the plunger 120 is actuated by means of a suitable drive in a controlled time sequence after the stuffer fork 152 so as to move the crop rearward into the bale chamber 138, where it becomes compacted into a stack. After the stack of compacted material has reached a preselected length, a needle assembly 158 for providing binding twine, which contains a plurality of curved needles, is actuated so as to feed a plurality of twines to a corresponding number of knotters (not shown), which act to lay yarn lengths around the preselected length of the stack, so as to form a bale 160, which is ready to be ejected, which then takes place when it is pressed out of the rear end region of the bale chamber 138 by a partial bale 162, as it increases in length because new flakes are stuffed into the bale chamber 138.

The plunger 120 is designed for a back and forth motion in the bale chamber 138 between a withdrawn position in front of the material inlet 144 and a partially extended position (shown in FIG. 2) through the material inlet 144, from which it can move still further to the rear until it strikes a partial bale 162. The motion of the plunger 120 has the result that flakes that are introduced into the bale chamber 138 from the feed channel 146 are compacted against a stack of crop, which includes the partially formed bale 162 and/or the complete bale 160. To deposit the bale 160 on the ground gently, a depositing device 164 is mounted at the rear end of the frame 134 as a rearward extension of the lower part of the housing 142.

The plunger 120 is driven via the PTO shaft 118 of the tractor 110, which drives an input shaft 168 of the drive device 170 of the plunger 120 via a cardan shaft 166. The input shaft 168 drives a flywheel 172 and, via a gearbox 174, a crankshaft 178, whose motion is transmitted to the plunger 120 via a connecting rod 176.

Figure 3:
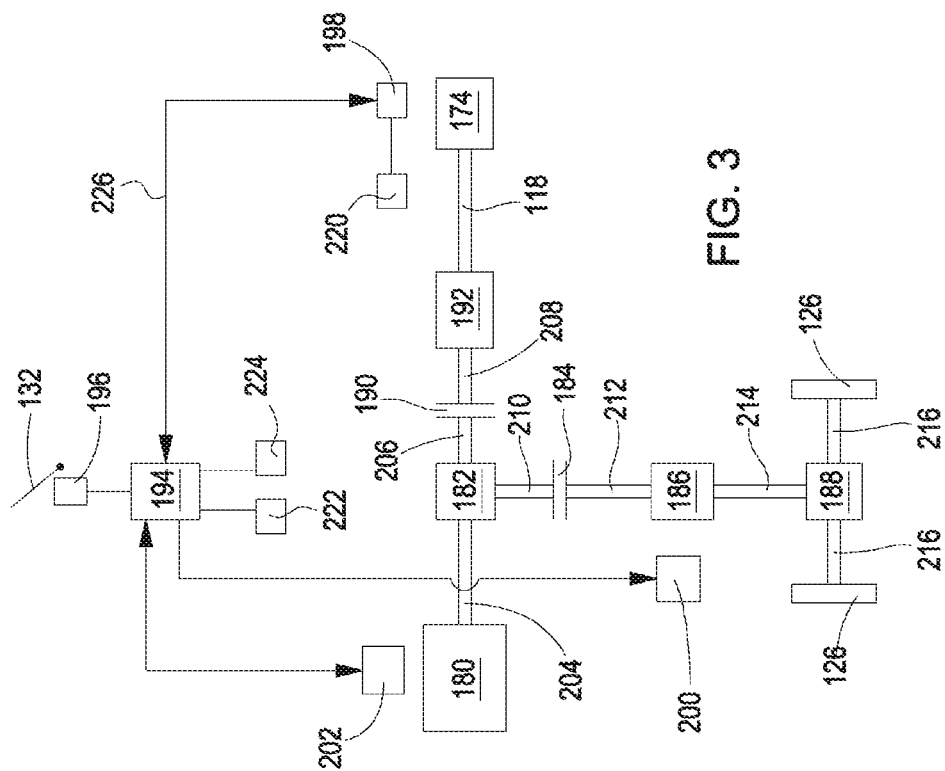
FIG. 3 shows a schematic drawing of a drive system of the tractor in accordance with an embodiment of the present disclosure.

FIG. 3 shows a schematic drawing of the drive system of the tractor 110 and the baler 114. A drive motor 180 of the tractor 110, which can be made as an internal combustion (diesel) engine or as an electric motor, drives by its output shaft 204 a transfer case 182, which has a first propulsion output shaft 210 and a load output shaft 206. The transfer case 182 can make a direct connection to output shaft 204 for one of the shafts 210 or 206. The propulsion output shaft 210 drives, via a clutch 184, a transmission input shaft 212, which drives a drive transmission 186 with variable transmission ratio (for example, designed as a powershift transmission or continuously variable transmission), which drives the rear wheels 126 on the output side via a shaft 214, a differential gearbox 188, and wheel driveshafts 216. Optionally, the propulsion transmission 186 can also drive the front wheels 124 via drive means that are not shown. The load output shaft 206 is in drive connection with the PTO shaft 118 via a PTO shaft clutch 190 and a PTO shaft transmission 192, the PTO shaft serving to drive the transmission 174 of the drive device 170 and other driven elements of the baler 114.

The transfer case 182, the propulsion driveshaft 210, the clutch 184, the propulsion gearbox 186, the shaft 214, the differential gear 188, and the wheel driveshafts 216 form a propulsion/drive train driven by drive motor 180 for driving the propulsion means (wheels 126) of the tractor 110, which has a transmission ratio that can be varied by means of actuator 200. The transfer case 182, the load output shaft 206, the clutch 190, the PTO shaft transmission 192, the PTO shaft 118, and the transmission 174 (with the subsequent components for driving the plunger 120) form a load drive train to drive the baler 114 which is driven by the drive motor 180.

An electronic control 194 is connected to a control unit 198 of the baler 114, an actuator 200 to set the transmission ratio of the propulsion transmission 186, an engine control 202, a speed setting sensor 196 to detect the setting of the input device 132, and actuators (not shown for sake of simplicity) for engaging and disengaging the clutches 184 and 190, although the latter could also be actuated by the operator by hand or foot.

The control 198 of the baler is connected via a bus system 226 to the control 194 of the tractor 110. The control 194 is connected to a memory 224 and a position determining device 222, which can be of the same kind as the position determining device 90 of the combine harvester 10 in FIG. 1. A map that originates from the memory device 88 of the combine harvester 10 in FIG. 1 is stored in memory 224 for a field on which the windrow 64 produced by the combine harvester 10 lies. The transfer of the map can take place physically by means of a memory map, which is transferred from the combine harvester 10 to the tractor 110, or wirelessly, for example via a cell phone or WLAN connection. The map can still be further processed before being stored in memory 224, for example on a farm computer or at a service provider, so as to take into account, for example, weather conditions (temperature, location of windrow on the field, etc.) under which the straw has dried since being harvested.

Operation During Baling

Figure 4:
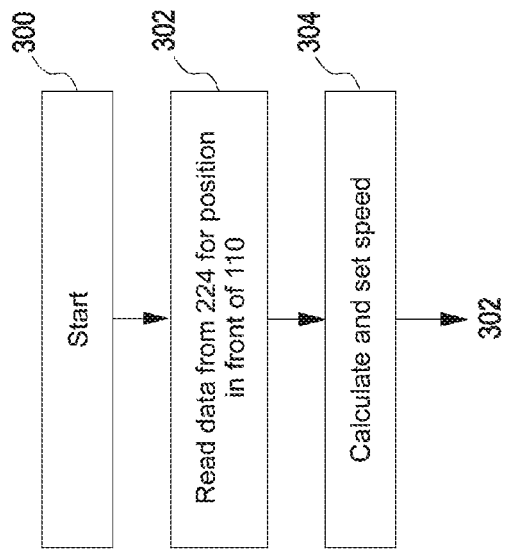
FIG. 4 shows a flow chart by which the control of the drive system operates in accordance with an embodiment of the present disclosure.

The procedure of control 194 that is used in baling is shown in FIG. 4. After the start in step 300, in step 302 the amount of straw lying in windrow 64 in front of the tractor 110 is read from the memory device 224 by means of the position of the tractor 110 determined by the position determining device 222. A speed of tractor 110 that corresponds to a desired throughput of straw at pickup 148 of baler 114 is determined in step 304 by means of the thus determined amount of straw. The actuators 200 and/or 202 are correspondingly adjusted. In this way a speed of the baler 114 that is suitable for pickup of the relevant amount of straw is predictively reached.

In a refinement the baler 114 can be equipped with a moisture sensor 220 to detect the humidity of the straw in the windrow 64, the measured value of which can be sent to the control 194 by the control device 198 via the bus 226 and taken into account by the control to affect the speed of the tractor 110 and thus the baler 114. Moisture values obtained by the combine harvester 10 during the harvesting operation and entered in the map can be used here, where the sensor 220 provides reference values by means of which the mapped moisture level in the windrow can be calibrated.

Analogously, the baler 114 can be equipped, for example in its precompression chamber 146, with sensors to determine the mass throughput that detect the force on stuffer 150, 152, and/or the precompression chamber floor (sensor 156) and from that data calculate the mass throughput (see European Patent Application EP 3001894 A1). By means of the current mass throughput data, which can be reported to the control 194 via the control device 198, the control 194 can calculate, taking into account the stored (predicted) straw amounts, a speed of travel and command it in a substantially known way. In particular, in the case of "wet clumps" or large buildups of straw, the control system is very highly delayed, unlike previously known systems, so that the amount of crop can be picked up and compacted without additional operator intervention.

It should also be noted that the data of the control unit 194 of tractor 110, shown in reference to FIGS. 2 to 4, can alternatively also be taken on by the control device 198 of the baler 114. In this embodiment, the control device 198 calculates the desired speed of the baler 114 and, via bus 226, forwards it to control unit 194, which in turn commands the speed of the tractor 110. The position determining device 222 could then be located directly on board the baler 114 and be connected directly to the control device 198 or remain on board the tractor 110 and send its data to the control unit 198 via the bus 226 or another connection.

The invention claimed is:

1. A method for control of a speed of a baler, the method comprising:
   detecting and mapping at least one of a crop property and data derived therefrom during a harvesting of a field by a combine harvester in which crop residues are deposited in a windrow; and
   controlling the speed of the baler during a pickup of the windrow while taking into account the mapped at least one of the crop property and the data derived therefrom,
   wherein the mapped crop property comprises at least one of a geometric measurement, a mass of a crop residue deposited in the windrow, a moisture level of the crop residue, an average straw length, a length distribution of individual straws, the type of crop, an indication of wet clumps, an indication of a windrow buildup, a grain yield, a grain moisture, and the speed of the baler.

2. The method of claim 1, further comprising taking into account, during mapping, at least one of 1.) a delay time between a sensing of the crop property and a deposition of the crop residue on the field and 2.) an offset between a position determining device and a point of sensing the crop property.

3. The method of claim 2, wherein the delay time is determined by at least one of a transport speed of an auger system, a rotary speed of an inclined grain conveyor, a rotor speed of a threshing rotor, a rotor speed of a separating rotor, and a rotary speed of a drive of a straw walker.

4. The method of claim 1, wherein the crop property is determined by at least one of at least one sensor and an operating parameter of the combine harvester.

5. The method of claim 4, wherein the operating parameter of the combine harvester is a drive power of a conveyor element for a crop.

6. The method of claim 4, where the at least one sensor is an optical sensor interacting with a crop one of upstream from the combine harvester, in the combine harvester, and downstream from the combine harvester.

7. The method of claim 1, wherein the baler comprises at least one sensor to detect the crop property and the speed of the baler is calibrated by at least one signal of the at least one sensor.

8. The method of claim 1, wherein a calculation of set speed values takes place via at least one of a control device of the combine harvester, a control unit of the baler, a control of a utility vehicle pulling the baler, and a computer separate from the combine harvester, the baler, and the utility vehicle.

9. An arrangement for control of a speed of a baler, the arrangement comprising at least one of a control of a towing vehicle pulling the baler and a control unit of the baler, the control unit of the baler being configured to control the speed of the baler in a pickup of a windrow while taking into account at least one of 1.) a crop property mapped during harvesting of a field by a combine harvester, crop residues being deposited by the combine harvester in the windrow, and 2.) data derived from the crop property,
   wherein the mapped crop property comprises at least one of a geometric measurement, a mass of a crop residue deposited in the windrow, a moisture level of the crop residue, an average straw length, a length distribution of individual straws, the type of crop, an indication of wet clumps, an indication of a windrow buildup, a grain yield, a grain moisture, and the speed of the baler.

10. A method for control of a speed of a baler, the method comprising:
    creating an application map based on data derived from a crop property during a harvesting of a field in which crop residues are deposited in a windrow; and
    predictively controlling a throughput of the baler using the application map by controlling the speed of the baler during a pickup of the windrow using the application map based on the data derived from the crop property;
    wherein the crop property comprises at least one of a geometric measurement, a mass of a crop residue deposited in the windrow, a moisture level of the crop residue, an average straw length, a length distribution of individual straws, the type of crop, an indication of wet clumps, an indication of a windrow buildup, a grain yield, a grain moisture, and the speed of the baler.

11. The method of claim 10, wherein creating the application map takes into account at least one of 1.) a delay time between a sensing of the crop property and a deposition of the crop residue on the field and 2.) an offset between a position determining device and a point of sensing the crop property.

12. The method of claim 11, wherein the delay time is determined by at least one of a transport speed of an auger system, a rotary speed of an inclined grain conveyor, a rotor speed of a threshing rotor, a rotor speed of a separating rotor, and a rotary speed of a drive of a straw walker.

13. The method of claim 10, wherein the crop property is determined by at least one of at least one sensor and an operating parameter of a combine harvester harvesting the field.

14. The method of claim 13, wherein the operating parameter of the combine harvester is a drive power of a conveyor element for a crop.

15. The method of claim 13, where the at least one sensor is an optical sensor interacting with a crop one of upstream from the combine harvester, in the combine harvester, and downstream from the combine harvester.

16. The method of claim 10, wherein the baler comprises at least one sensor to detect the crop property, and the speed of the baler is calibrated by at least one signal of the at least one sensor.

17. The method of claim 10, further comprising calculating set speed values via at least one of a control device of a combine harvester harvesting the field, a control unit of the baler, a control of a utility vehicle pulling the baler, and a computer separate from the combine harvester, the baler, and the utility vehicle.

* * * * *